United States Patent [19]

Begin, Jr.

[11] Patent Number: 4,842,155

[45] Date of Patent: Jun. 27, 1989

[54] MOUNTING APPARATUS FOR ELECTRICAL DEVICES

[76] Inventor: John R. Begin, Jr., 109 Longview Ave., Hackensack, N.J. 07601

[21] Appl. No.: 55,832

[22] Filed: Jun. 1, 1987

[51] Int. Cl.$^4$ ............................................. H02G 3/08
[52] U.S. Cl. ........................................ 220/3.6; 220/3.7
[58] Field of Search .................. 220/3.6, 3.7, 3.9, 3.3, 220/18; 174/57

[56] References Cited

U.S. PATENT DOCUMENTS

| | | | |
|---|---|---|---|
| 1,066,805 | 7/1913 | Fisher | 220/3.7 |
| 2,309,189 | 1/1943 | Hancock . | |
| 2,374,993 | 5/1945 | Haynes . | |
| 2,378,861 | 6/1945 | Peevey | 220/3.7 |
| 2,989,206 | 6/1961 | McAfee | 220/3.7 |
| 3,378,160 | 4/1968 | Bassani . | |
| 3,468,448 | 9/1969 | McHollan . | |
| 3,620,404 | 11/1971 | Grasso | 220/3.7 X |
| 3,906,145 | 9/1975 | Carmichael . | |
| 4,087,624 | 5/1978 | Hitchcock | 174/57 |
| 4,134,636 | 1/1979 | Kleinatland et al. | 220/3.9 X |
| 4,163,501 | 8/1979 | Lass . | |
| 4,494,815 | 1/1985 | Brzostek . | |
| 4,628,827 | 12/1986 | Litter | 220/18 X |
| 4,634,015 | 1/1987 | Taylor | 220/3.7 |

Primary Examiner—Steven M. Pollard
Attorney, Agent, or Firm—Robert A. Green; Abraham Wilson

[57] ABSTRACT

The mounting apparatus is used for securing an electrical device and its electrical outlet in place over the original outlet box in a wall which is to have siding applied thereto. The mounting apparatus comprises a first plate adapted to be secured flat to the wall to be sided and positioned over an electrical outlet box therein. The first plate has an opening and a rectangular wall surrounding the opening and rising from its top surface. A second plate is provided having an opening and rectangular wall means surrounding the opening therein and secured to its lower surface. The second plate is coupled to the first plate by means of the two walls on the plates being adapted to form a tight mechanical fit with each other.

The openings in the two plates are aligned with each other and this permits the electrical outlet to be removed from the outlet box, drawn through the aligned openings and secured to the second plate. The appropriate electrical device is then secured to the electrical outlet or the usual cover plate is secured thereto.

8 Claims, 3 Drawing Sheets

MOUNTING APPARATUS FOR ELECTRICAL DEVICES

BACKGROUND OF THE INVENTION

At the present time, new siding which is applied to a house or other building is generally in the form of strips of aluminum, vinyl or the like. These strips are like clapboard and they have a cross-section such that when the strip is secured to the building, it slopes outwardly from the upper edge of the strip. This slope presents a problem for the installer when he must mount electrical devices such as electrical outlets, light fixtures or the like on the new siding. The slant or slope of each strip makes re-mounting the electrical device and its cover plate, or the light fixture, difficult since there is no solid, flat surface available to which a secure mounting can be made. The methods of mounting now employed do not provide a rigid support, are unattractive and are not waterproof.

The present invention provides a mounting apparatus for electrical devices which permits the devices to be mounted rigidly with an esthetically pleasing appearance, with no calking required to render the mount waterproof and, in general, it solves all problems now encountered in the installation of new siding around electical devices.

DESCRIPTION OF THE INVENTION

The mounting apparatus of the invention can be used to mount substantially any type of electrical device on the wall of a building which is to receive siding such as aluminum or vinyl siding in the form of strips shaped like clapboard. For convenience, a typical dual electrical outlet is shown and described herein as the electrical device which receives the mounting apparatus of the invention although the device may be a light fixture or the like.

The mounting apparatus of the invention has particular advantages when it is mounted on the old siding to be covered with new siding. But it may also be used in new construction where it is mounted on the plyood or other base for the siding.

Figure 1:
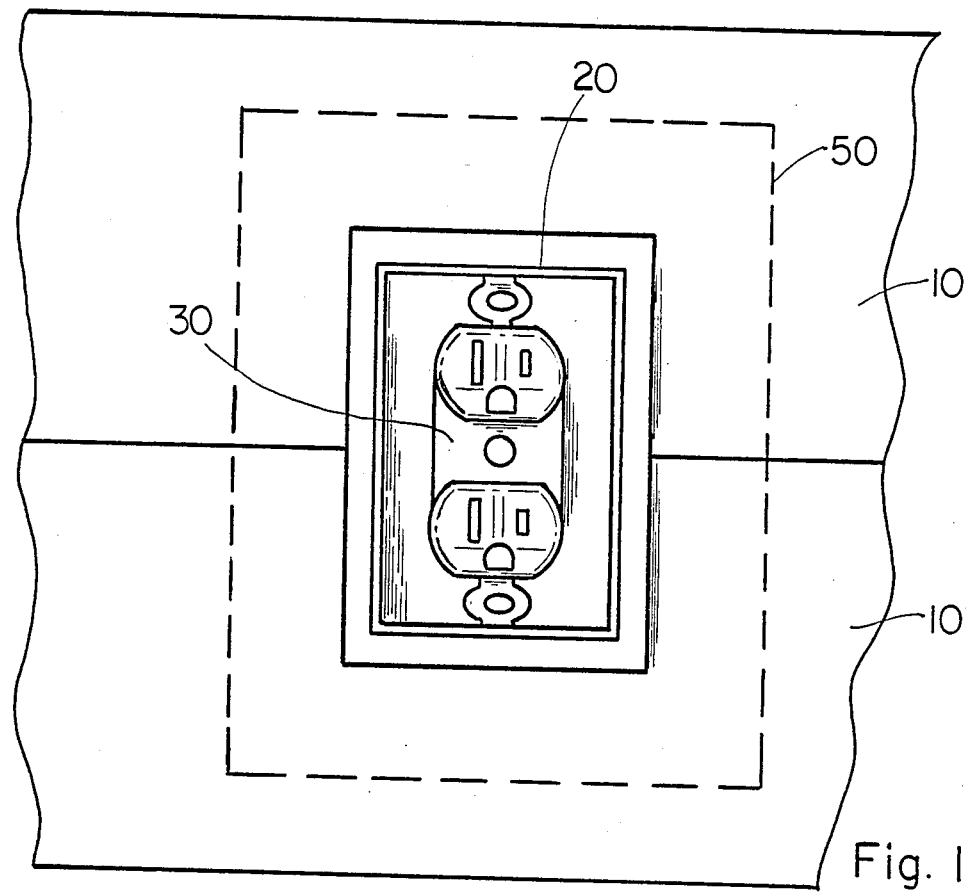
FIG. 1 is a plan view of a portion of a house to be sided showing an electrical device present in a wall of the house.
Figure 2:
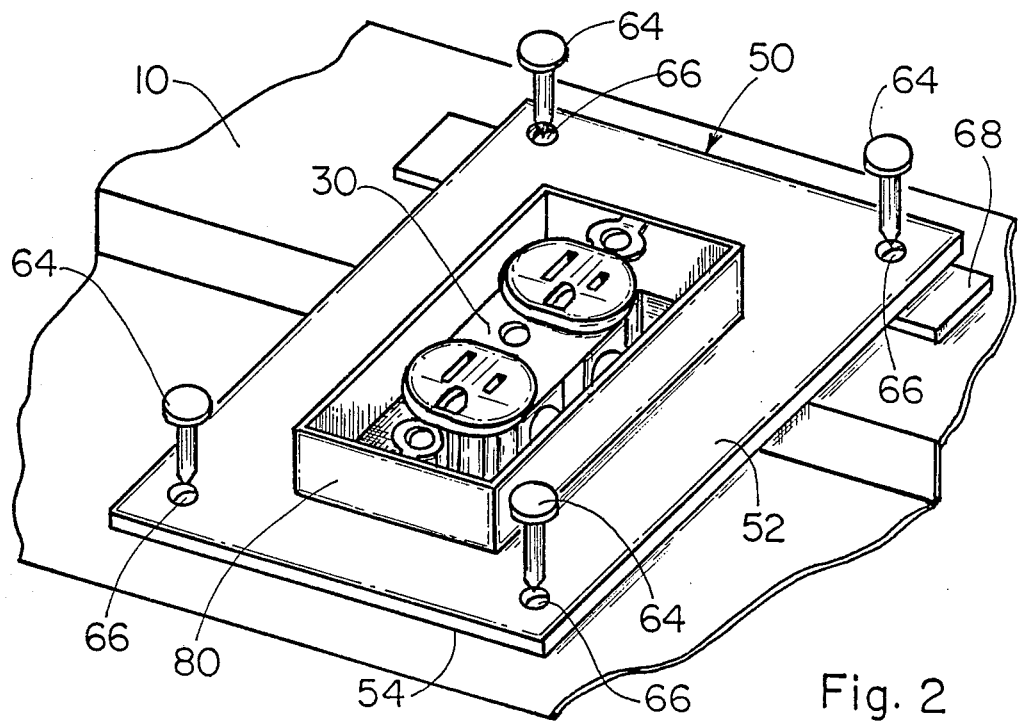
FIG. 2 is a perspective view of a portion of the wall of the house shown in FIG. 1 in association with a first portion of the mounting apparatus of the invention.
Figure 3:
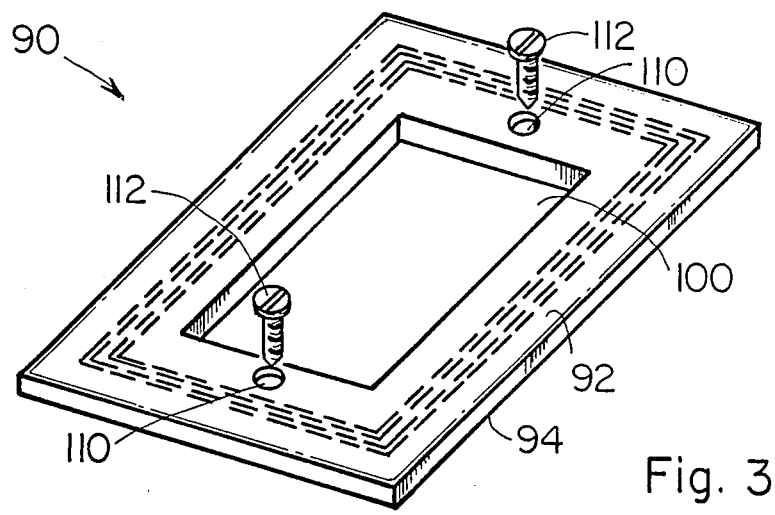
FIG. 3 is a perspective view of a second portion of the mounting apparatus of the invention.
Figure 4:
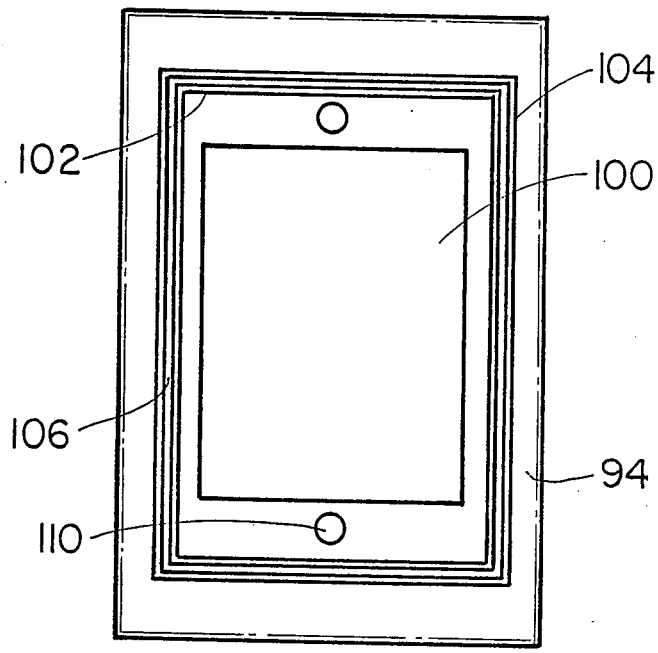
FIG. 4 is a plan view of the bottom of the apparatus shown in FIG. 3.
Figure 5:
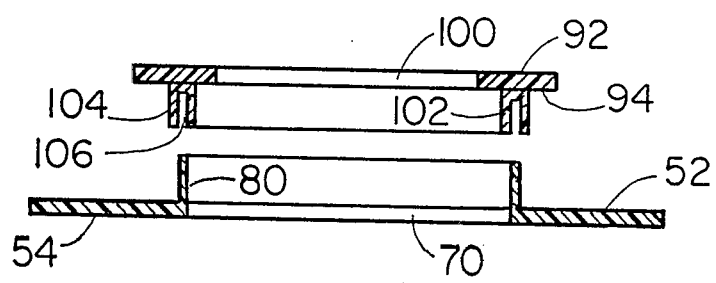
FIG. 5 is a sectional view of first and second portions of the mounting apparatus of the invention as they are about to be assembled.

For purposes of illustration of the use of the mounting apparatus of the invention, referring to FIG. 1, a portion of the old clapboard strips 10 of the old siding of a house is shown with the cover plate removed from an electrical outlet box 20 having an electrical outlet 30 therein.

The mounting apparatus of the invention 40 includes a first relatively large-area base plate 50 of an insulating material such as a synthetic resinous material, a plastic. The plate 50 may be rectangular or it may have any suitable shape and it has a top surface 52 and a bottom surface 54. The plate 50 may be, for example, 4"×5" in dimensions if it is rectangular. The plate 50 (only the outline is shown in FIG. 1) is secured to the siding strips 10 over the electrical outlet 30 by means of screws and/or nails 64 inserted in holes 66 in the plate. To support the plate rigidly on the clapboard strips, a furring strip 68 is secured to the siding strip 10 beneath the upper portion of the plate 50 as shown, or at any other suitable location. It can be seen that this arrangement also permits the plate 50 and the entire mounting apparatus of the invention to be mounted flat up against the building wall. The plate 50 has a rectangular opening 70 which overlies and is larger in area than the area defined by the outlet box 20 and is of a suitable size to receive the outlet 30 as described below.

The opening 70 in plate 50 is surrounded by an upstanding rectangular wall 80. When the plate 50 has been secured in place, the electrical outlet 30 in the outlet box 20 is detached and pulled through the opening 70 with its wires 32 still connected to it.

The mounting apparatus 40 also includes a second plate 90 which is larger than the rectangular opening 70 in the first plate 50. The second plate 90 has a top surface 92 and a bottom surface 94 and it includes a rectangular opening 100 which is adapted to overlie the opening 70 in plate 50 and the electrical box 20 and outlet 30. Rectangular opening 100 is smaller in area than rectangular opening 70 in plate 50 but it is suitably dimensioned to receive electrical outlet 30. The bottom surface of plate 90 has two closely spaced depending walls 102 and 104 which surround the opening 100 in plate 90 and are spaced apart so that when the plate 90 is pushed into engagement with plate 50, upstanding wall 70 slips into the space 106 between walls 102 and 104 and a relatively snug fit is provided between the plate 50 and the plate 90. The coupling is thus water tight.

Figure 6:
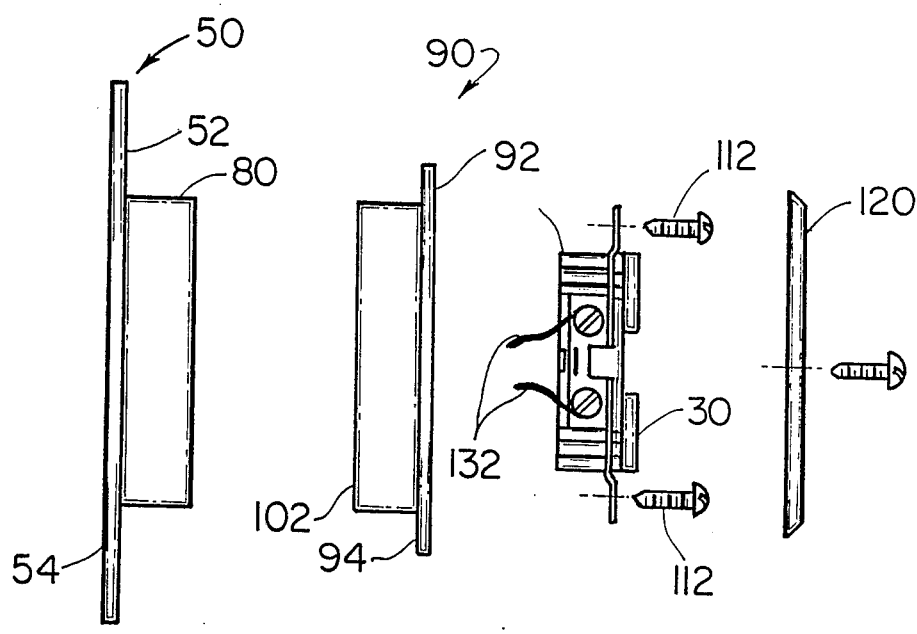
FIG. 6 is a side elevational, exploded view of the mounting apparatus of the invention.

The second plate 90 has holes 110 which are used to receive screws 112 to secure the electrical outlet 30 in place in opening 100 therein. The screws 112 extend into the outlet box 20. A standard fixture cover plate 120 is secured in place over the opening 100 in the second plate and covers the wires, mounting brackets and the like which are part of the electrical outlet (FIG. 6).

Figure 7:
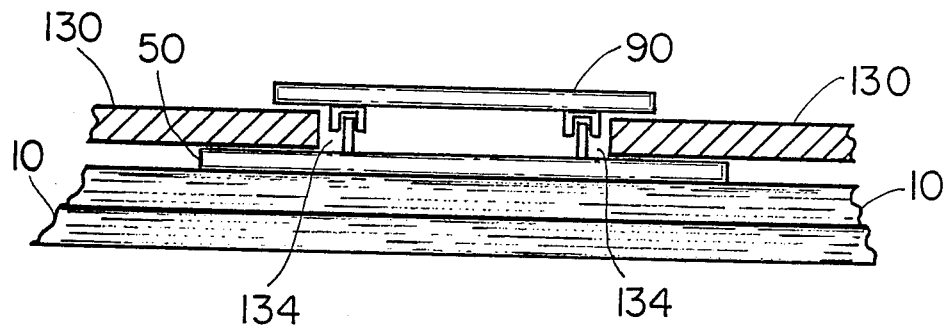
FIG. 7 is a side, elevational view, partly in section showing the first and second portions assembled and illustrating the position of new siding with respect thereto.

The new siding being applied is cut out as required so that the strips 130 thereof lie between the plate 50 and 90 with sufficient room, 134 provided all around for expansion and contraction thereof (FIG. 7).

Figure 8:
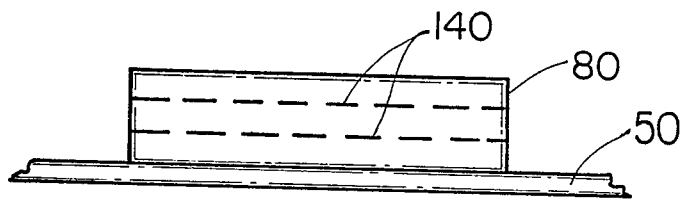
FIG. 8 is a side, elevational view of a modification of the first portion of the apparatus of the invention.

In a modification of the invention shown in FIG. 8, the base plate 50 is manufactured with the upstanding wall 80 of considerable height and provided with one or more score lines 140 extending around the wall. The score lines permit a portion of the wall to be removed to provide the desired height of the wall so that in the final assembly the desired space will be provided between plates 50 and 90 to receive the new siding with the proper fit.

The invention, as described, has many advantages; one of the most important of which is that it is secured rigidly and flat to the plywood or the original wooden or asbestos siding on the building. Since the two walls 50 and 90 are in watertight engagement with each other, the mounting is waterproof and no unsightly calking is required. The mounting apparatus of the invention is simple in construction and can be mounted quickly and since it is of insulating material, it providess electrical insulation to the installer and home owner. The work is self trimming and no "J" channel is required as in most present day work. The mount can also accommodate any thickness of insulation board.

What is claimed is:

1. Mounting apparatus for an electrical device in a wall which is to have siding applied thereto comprising
    a first plate adapted to be secured to a wall to be sided, said wall containing an electrical outlet box and an electrical outlet,
        said first plate having a top surface and a bottom surface,
    a first wall means rising from said top surface of said first plate,
    a second plate adapted to be coupled to said first plate, said second plate having a top surface and a bottom surface, and
    a second wall means extending downwardly from said bottom surface of said second plate,
    said first wall means and said second wall means including structure which permits them to form a tight mechanical fit with each other when said first plate is coupled to said second plate to form a unitary assembly,
    said first and second walls including aligned opening which are adapted to receive said electrical outlet for mounting to the unitary assembly of said first wall one of said wall means comprising a single wall and the other of said wall means comprising a pair of closely spaced walls and said second wall.

2. The apparatus defined in claim 1 wherein said first wall means surrounds said opening in said first plate and said second wall means surrounds said opening in said second plate.

3. The apparatus defined in claim 1 wherein the opening in said first plate is generally rectangular and the opening in said second plate is generally rectangular.

4. The apparatus defined in claim 1 wherein one of said wall means includes means to permit the height of the wall to be adjusted.

5. The apparatus defined in claim 4 wherein said means comprises score lines in said one of said wall means to permit a portion of said one of said wall means to be removed whereby the height of said one of said wall means in adjusted.

6. Mounting apparatus for securing an electrical device in place comprising
    a first flat plate having an opening and adapted to overlie an electrical outlet in a wall, said first plate having a top surface and a bottom surface,
    a first upstanding rectangular wall rising upwardly from said top surface of said first plate,
    a second flat plate having an opening adapted to overlie said opening in said first plate, said second plate having a top surface and a bottom surface,
    a pair of closely spaced depending walls secured to said bottom surface of said second plate and disposed in rectangular array,
    said first wall and said pair of walls being dimensioned and arrayed so that when said second plate is disposed over said first plate, said pair of walls are aligned with and overlie said first wall and said first wall can be inserted into the space between said pair of walls to form a relatively tight fit between said first plate and said second plate,
    said electrical outlet being adapted to be pulled through said openings in said first and second plates and secured to said second plate, and
    a cover plate adapted to be secured to said second plate with said electrical outlet exposed therethrough.

7. Mounting apparatus for an electrical device in a wall which is to have siding applied thereto comprising
    a first plate adapted to be secured to a wall to be sided, said wall containing an electrical outlet box and an electrical outlet,
        said first plate having a top surface and a bottom surface,
    a first wall means rising from said top surface of said first plate,
    a second plate adapted to be coupled to said first plate, said second plate having a top surface and a bottom surface, and
    a second wall means extending downwardly from said bottom surface of said second plate,
    said first wall means and said second wall means including structue which permits them to form a tight mechanical fit with each other when said first plate is coupled to said second plate to form a unitary assembly,
    said first and second walls including aligned opening which are adapted to receive said electrical outlet for mounting to the unitary assembly ofsaid first wall and said second wall,
    one of said wall means comprising a single wall and the other of said wall means comprising a pair of closely spaced walls, the single wall being adapted to be inserted into the space between said pair of walls whereby said tight mechanical fit is achieved.

8. The apparatus defined in claim 7 wherein said pair of closely spaced walls are present at the upper end of said other wall means which is engaged by the end of said one of said wall means.

* * * * *